US012738272B2

(12) United States Patent
Hill

(10) Patent No.: US 12,738,272 B2
(45) Date of Patent: Sep. 15, 2026

(54) SYSTEM FOR DISTRIBUTION OF CONTENT AND ANALYSIS OF CONTENT ENGAGEMENT

(71) Applicant: Disctopia, Inc., Charlotte, NC (US)

(72) Inventor: Patrick A. Hill, Charlotte, NC (US)

(73) Assignee: Disctopia, Inc., Charlotte, NC (US)

( * ) Notice: Subject to any disclaimer, the term of this patent is extended or adjusted under 35 U.S.C. 154(b) by 131 days.

(21) Appl. No.: 18/758,925

(22) Filed: Jun. 28, 2024

(65) Prior Publication Data

US 2025/0006191 A1 Jan. 2, 2025

Related U.S. Application Data

(60) Provisional application No. 63/523,865, filed on Jun. 28, 2023.

(51) Int. Cl.
*G10L 15/22* (2006.01)

(52) U.S. Cl.
CPC ........ *G10L 15/22* (2013.01); *G10L 2015/223* (2013.01)

(58) Field of Classification Search
CPC ....... G10L 25/48; G06F 16/685; G06F 16/686
See application file for complete search history.

(56) References Cited

U.S. PATENT DOCUMENTS

2010/0211439 A1 8/2010 Marci et al.
2015/0081457 A1 3/2015 Agnes
2015/0163561 A1* 6/2015 Grevers, Jr. ..... H04N 21/42203 704/235
2015/0302470 A1 10/2015 Dru et al.
2015/0331553 A1 11/2015 Shaffer
2017/0287002 A1 10/2017 Bakhtiari
2017/0295404 A1 10/2017 Meredith et al.
2019/0294630 A1* 9/2019 Alakoye ................. G10L 15/26
2019/0294668 A1 9/2019 Goel et al.
2019/0306549 A1 10/2019 Dietz et al.

FOREIGN PATENT DOCUMENTS

WO WO-2016099354 A1 * 6/2016 ......... H04N 21/8456

OTHER PUBLICATIONS

H. Bhagava, "The Creator Economy: Managing Ecosystem Supply, Revenue Sharing, and Platform Design," Management Science, 2022. (Year: 2022).*
Ishtiaq, et al. "User tracking mechanisms and counter-measures," IJAMEC, 2017. (Year: 2017).*
International Search Report issued in corresponding International Patent Application No. PCT/US2024/036144 on Sep. 27, 2024, 3 pages.
Written Opinion issued in corresponding International Patent Application No. PCT/US2024/036144 on Sep. 27, 2024, 9 pages.

* cited by examiner

*Primary Examiner* — Paras D Shah
(74) *Attorney, Agent, or Firm* — Bradley Arant Boult Cummings LLP; Henry B. Ward, III

(57) ABSTRACT

Systems, computer program products, and methods are described herein for distribution of content and analysis of content engagement. The present disclosure is configured to retrieve content from a first storage device, wherein the content comprises audio data, transform, using a speech recognition engine, the audio data into text data, receive a first selection, wherein the first selection identifies the content, retrieve the text data corresponding to the content from the first storage device, identify keywords from the text data, and stream the content.

25 Claims, 7 Drawing Sheets

SYSTEM FOR DISTRIBUTION OF CONTENT AND ANALYSIS OF CONTENT ENGAGEMENT

FIELD OF THE INVENTION

Exemplary embodiments of the present disclosure relate to the distribution of content and analysis of content engagement.

BACKGROUND

Producers of content are unable to discern between consumers of content actively participating in and/or engaging with the content, and those consumers who neglect to provide such attentive engagement thereto. This neglection of attentiveness could occur in various forms, such as the consumer only engaging for a small portion of the content, the consumer prematurely switching to an alternative content, the consumer focusing on other tasks rather than absorbing the information within the content, and so forth. However, neither the producers of the content nor the advertisers within the content are aware of this lack of attentiveness and are unable to discern (a) between consumers who consume the entirety of the content, and consumers who only consume a small portion of the content, and (b) between consumers who are attentively engaged in the content, and consumers who are not attentively engaged in the content. Thus, there is a need for a system for distribution of content and analysis of content management. Through applied effort, ingenuity, and innovation, many of these identified problems have been solved by developing solutions that are included in embodiments of the present disclosure, many examples of which are described in detail herein.

BRIEF SUMMARY

Systems, methods, and computer program products are provided for distribution of content and analysis of content engagement.

In one aspect, a content management system is presented, wherein the system may include a processing device, a non-transitory storage device containing instructions when executed by the processing device, causes the processing device to perform the steps of retrieving content from a first storage device, wherein the content comprises audio data, transforming, using a speech recognition engine, the audio data into text data, receiving a first selection, wherein the first selection identifies the content, retrieving the text data corresponding to the content from the first storage device, identifying keywords from the text data, and streaming the content.

In some embodiments, executing the instructions further causes the processing device to perform the steps of determining a status of the streaming of the content, wherein determining occurs at a predetermined interval subsequent an initiating of the stream of the content, and determining a presence metric of the stream of the content based on activity at each predetermined interval, wherein the presence metric increases for each subsequent interval for which the content is streamed.

In some embodiments, executing the instructions further causes the processing device to perform the steps of determining a publication timestamp of the content, determining a streaming timestamp of the streaming of the content; and determining a presence metric of the streaming of the content, wherein the presence metric is determined by comparing, to a predetermined threshold, a time difference between the publication timestamp and the streaming timestamp, wherein the presence metric is assigned a high value if the time difference is below the predetermined threshold, and wherein the presence metric is assigned a low value if the time difference is above the predetermined threshold.

In some embodiments, executing the instructions further causes the processing device to perform the steps of generating a prompt and a corresponding expected response based on the text data of the content, presenting the at least one prompt after streaming at least a portion of the content, receiving an input response to the prompt, determining a comparison result by comparing the input response to the corresponding expected response, storing in a second storage device at least one selected from the group consisting of (i) the input response, (ii) the prompt corresponding to the input response, and (iii) the comparison result, and determining an engagement score based on the comparison result.

In some embodiments, executing the instructions further causes the processing device to perform the steps of querying a second storage device for a supplemental content using the keywords identified from the text data, determining a relevant supplemental content, retrieving the supplemental content from the storage device of the system, transmitting the supplemental content, and presenting the supplemental content.

In some embodiments, the engagement score is weighted with an aggregate engagement score during the streaming.

In some embodiments, executing the instructions further causes the processing device to perform the steps of receiving interaction data with the supplemental content, applying cookie data, and determining, using the cookie data, if a transfer of electronic resources has occurred as a result of the supplemental content.

In some embodiments, executing the instructions further causes the processing device to perform the steps of receiving interaction data with the supplemental content, wherein the interaction data comprises an order identifier and an order timestamp, and a content identifier, and determining a content identifier and a supplemental content identifier, wherein the content identifier and the supplemental content identifier are associated with the order identifier.

In some embodiments, executing the instructions further causes the processing device to perform the steps of transferring electronic resources to at least one content owner of the content, wherein each of the at least one content owner of the content receives a predetermined percentage of the electronic resources based on the engagement score.

In some embodiments, executing the instructions further causes the processing device to perform the steps of transferring electronic resources from an account of a content owner of the supplemental content to at least one content owner of the content, wherein each of the at least one content owner of the content receives a predetermined percentage of the electronic resources.

In some embodiments, executing the instructions further causes the processing device to perform the steps of transferring electronic resources from an account of a content owner of the supplemental content associated with the supplemental content identifier to at least one content owner of the content associated with the content identifier, wherein each of the at least one content owner of the content receives a predetermined percentage of the electronic resources.

In another aspect, a computer program product for secured data analysis and synthetic identity detection in a distributed ledger network is presented. The computer program product may include a non-transitory computer-readable medium including code causing an apparatus to retrieve content from a first storage device, wherein the content comprises audio data, transform, using a speech recognition engine, the audio data into text data, receive a first selection, wherein the first selection identifies the content, retrieve the text data corresponding to the content from the first storage device, identify keywords from the text data, and stream the content.

In yet another aspect, a method for secured data analysis and synthetic identity detection in a distributed ledger network is presented. The method may include retrieving content from a first storage device, wherein the content comprises audio data, transforming, using a speech recognition engine, the audio data into text data, receiving a first selection, wherein the first selection identifies the content, retrieving the text data corresponding to the content from the first storage device, identifying keywords from the text data, and streaming the content.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
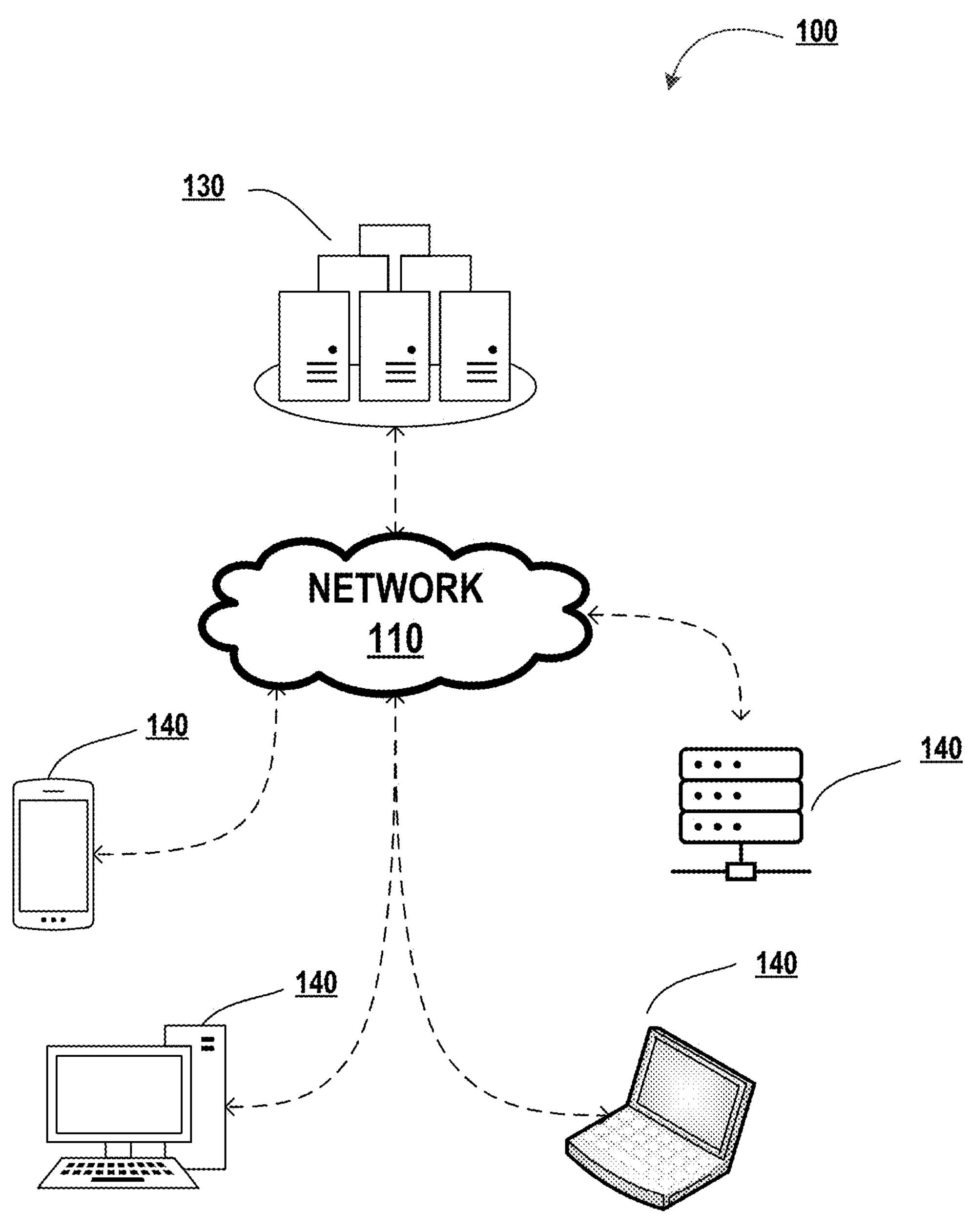
Figure 1B:
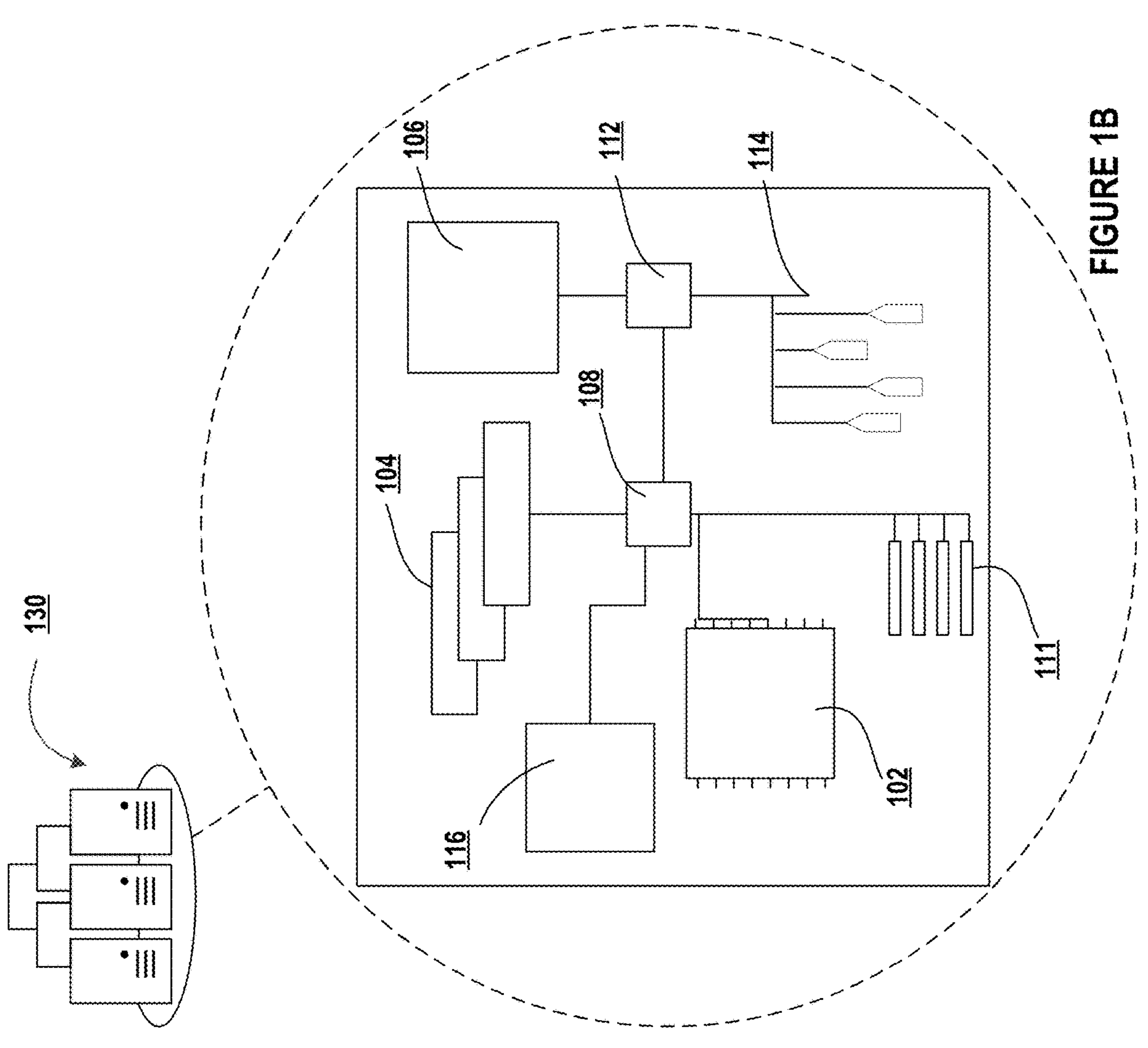
Figure 1C:
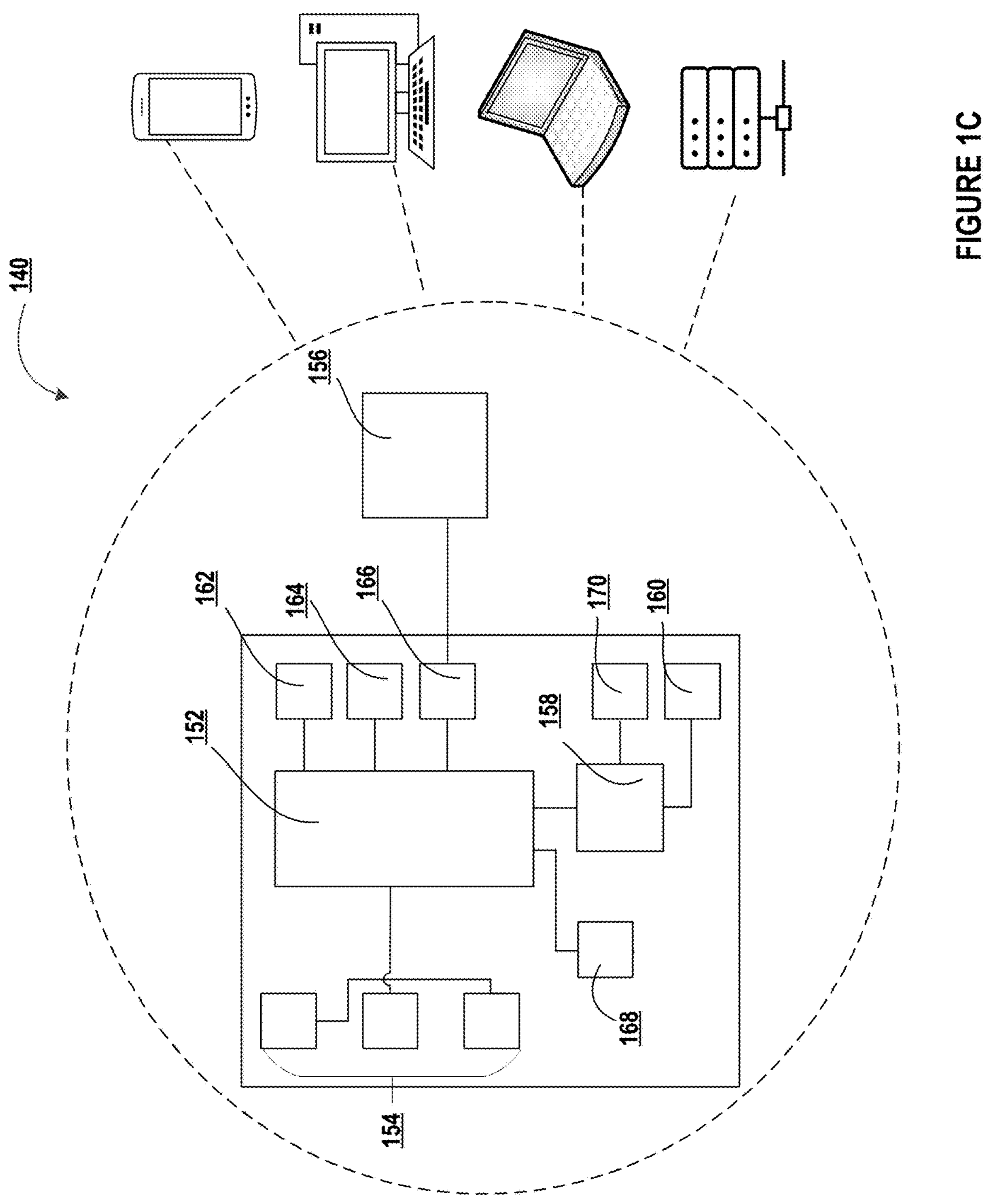
Figure 2:
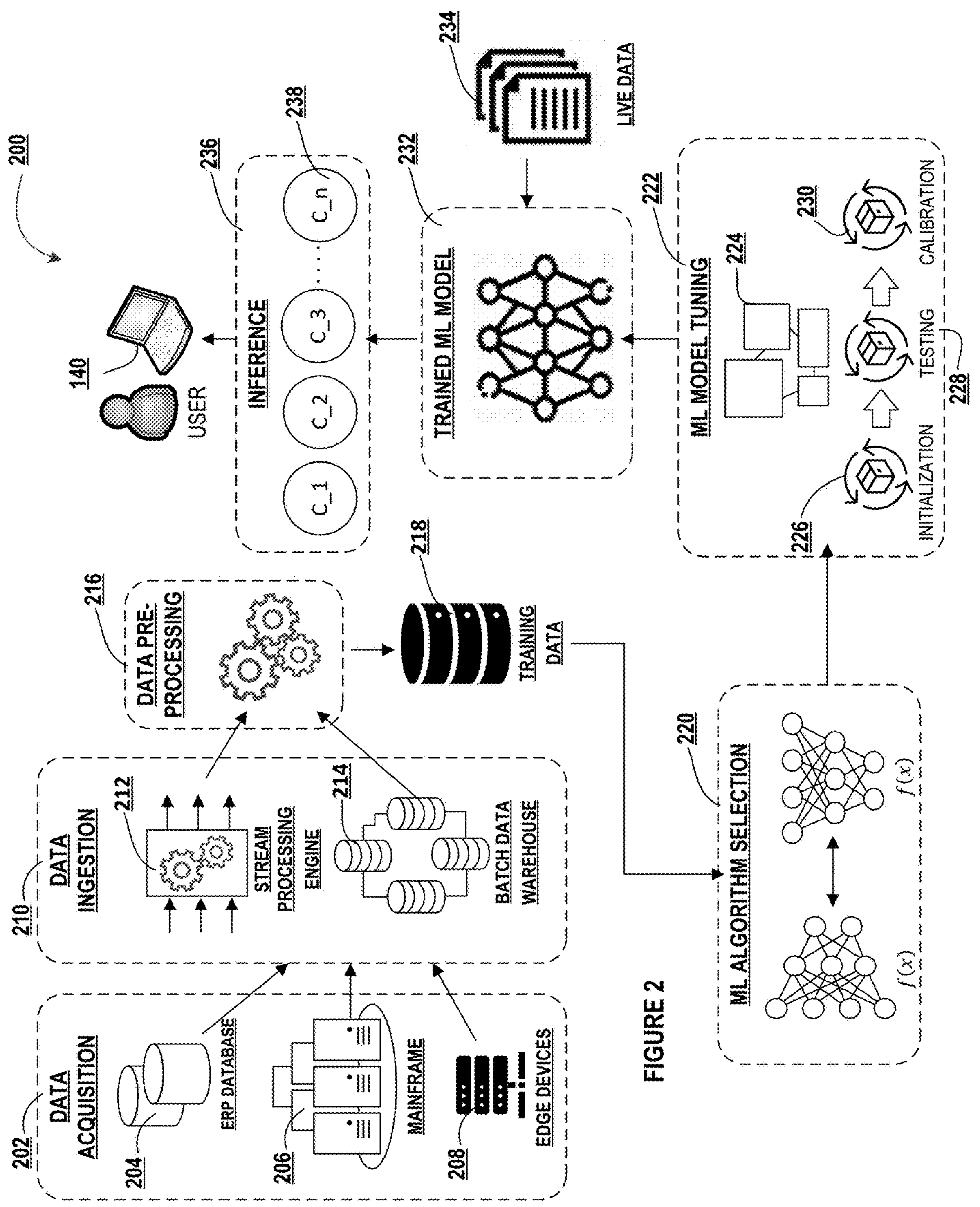
Figure 3:
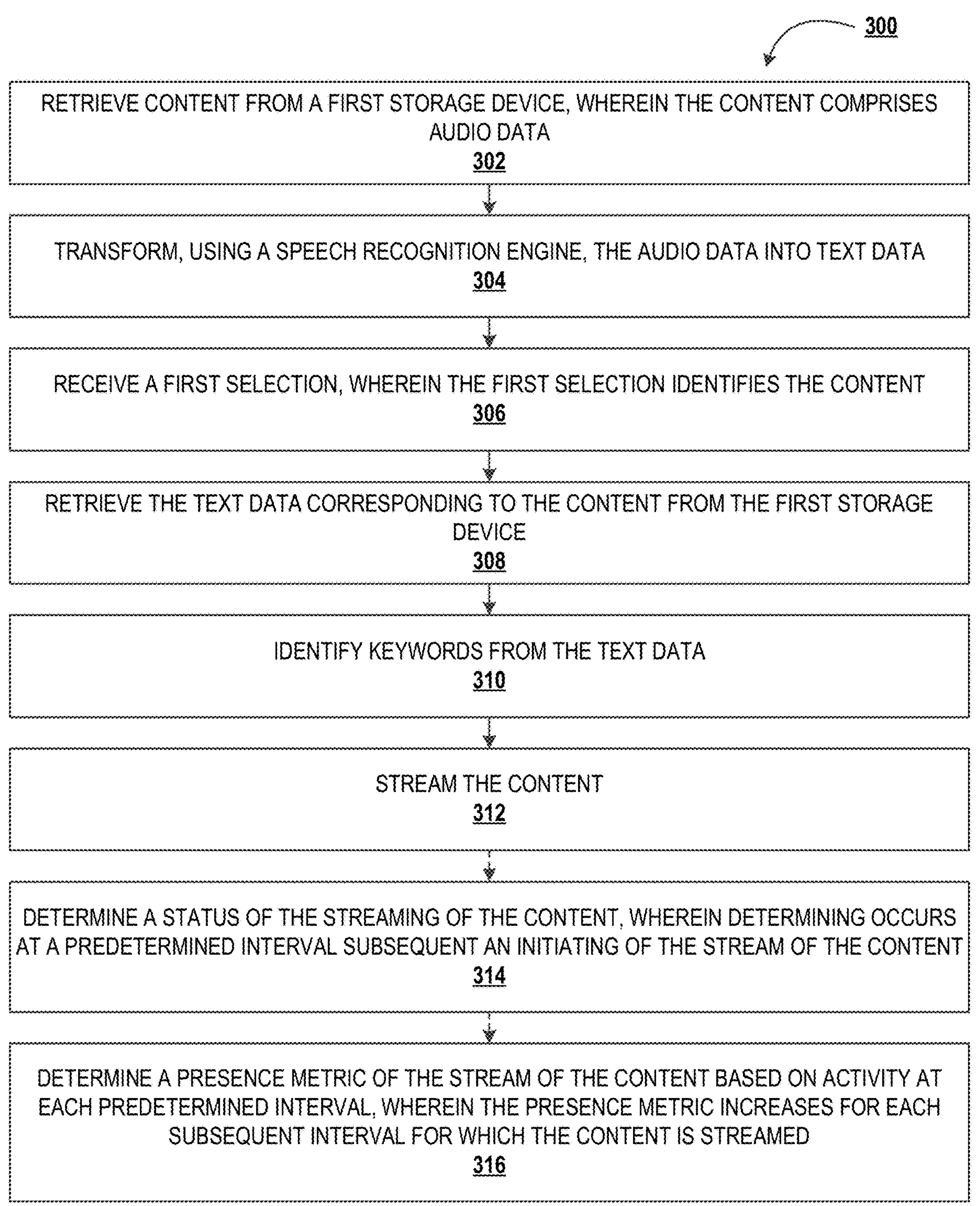
Figure 4:
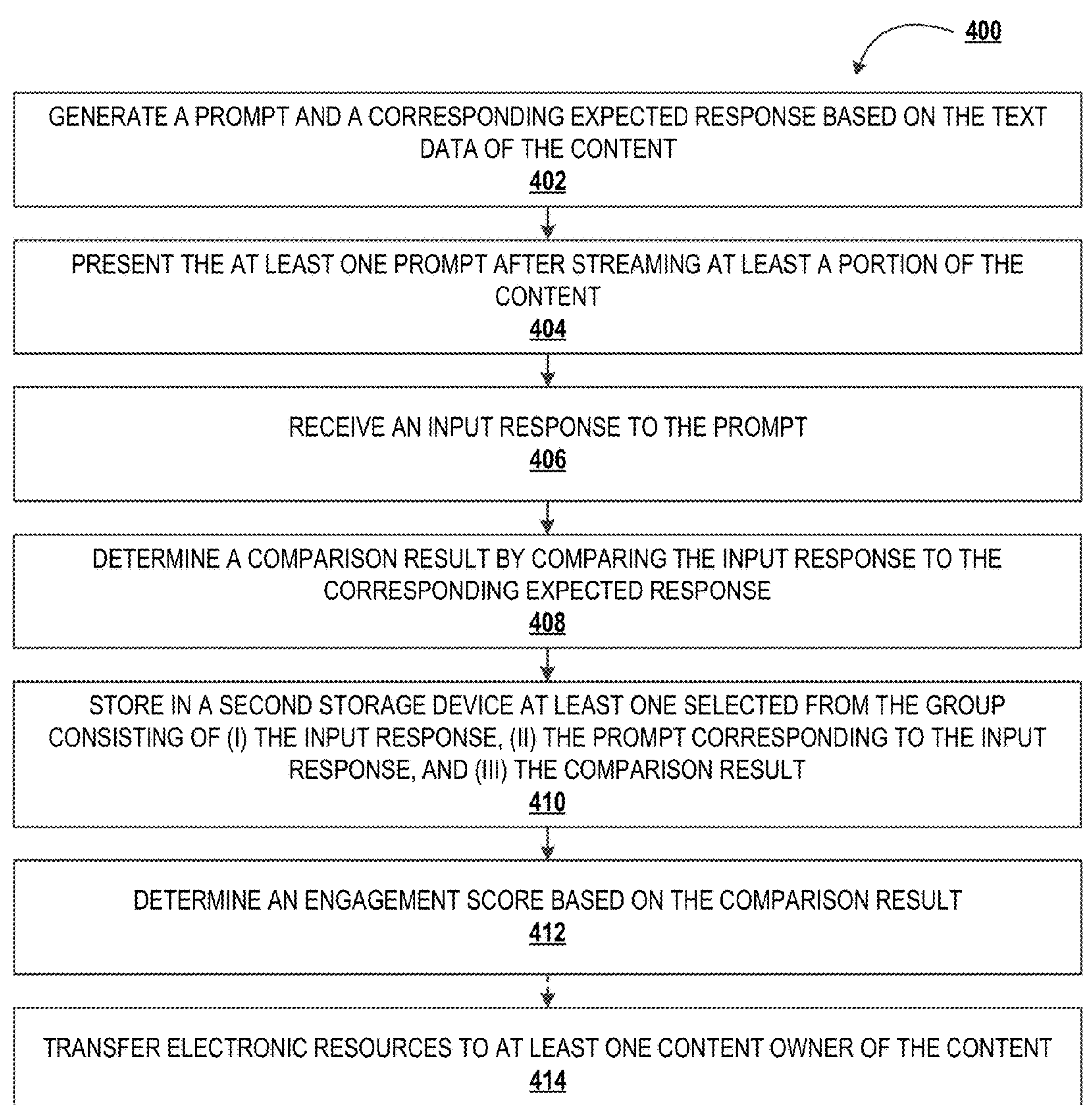
Figure 5:
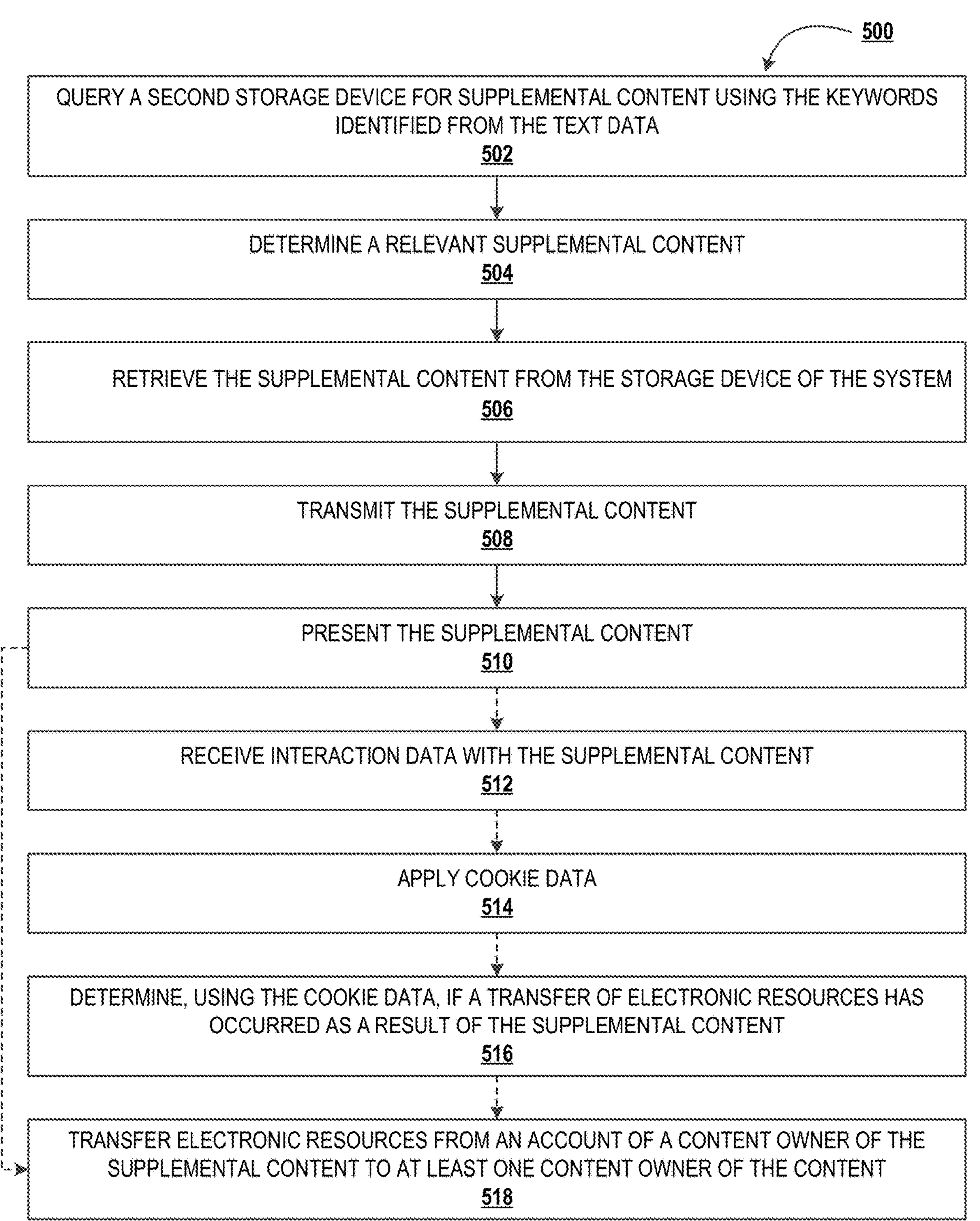

FIGS. 1A-1C illustrates technical components of an exemplary distributed computing environment for distribution of content and analysis of content engagement, in accordance with an embodiment of the disclosure;

FIG. 2 illustrates an exemplary machine learning subsystem architecture 200, in accordance with an embodiment of the disclosure;

FIG. 3 illustrates a process flow for distribution of content and analysis of content engagement, in accordance with an embodiment of the disclosure;

FIG. 4 illustrates a process flow for distribution of content and analysis of content engagement, in accordance with an embodiment of the disclosure; and FIG. 5 illustrates a process flow for distribution of content and analysis of content engagement, in accordance with an embodiment of the disclosure;

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, "content" may refer to multimedia data of various nature, including, but not limited to, streamed or locally downloaded: music, streamed videos, podcasts, radio shows, movies, advertisements (e.g., "supplemental content"), photo collages, educational lectures, training videos, emails, telephonic message, or other correspondence. Accordingly, content may contain various forms of digital data and corresponding metadata, such as audio data, video data, photograph data, etc. Content is generally consumed by consumers on client devices such as mobile phones, tablets, laptops, desktop computers, audio players, smartwatches, and so forth, where the client device is in communication with one or more computer servers of an entity. In some embodiments, the entity may provide proprietary software application(s) for installation and execution on the client device such as to facilitate via the internet the downloading and/or streaming of content. In other embodiments, the entity may provide an internet address of one or more servers in which content is stored, such that the user may incorporate the content into third-party software application(s). Content may take numerous forms, including, but not limited to MPEG-1 Audio Layer 3 ("MP3"), Waveform Audio File Format ("WAV"), Free Lossless Audio Codec ("FLAC"), Advanced Audio Coding ("AAC"), Ogg Vorbis ("OGG"), Windows Media Audio ("WMA"), Audio Interchange File Format ("AIFF"), MPEG-4 Audio ("M4A"), Adaptive Multi-Rate ("AMR"), and Musical Instrument Digital Interface ("MID" or "MIDI"). For video, commonly used filetypes include MPEG-4 Part 14 ("MP4"), Audio Video Interleave ("AVI"), QuickTime File Format ("MOV"), Matroska Video ("MKV"), Windows Media Video ("WMV"), Flash Video ("FLV"), Moving Picture Experts Group ("MPEG"), 3rd Generation Partnership Project ("3GP"), WebM ("WebM"), and Advanced Systems Format ("ASF"). It shall be appreciated that some content contains audio in any number of the aforementioned formats, while other content contains video in any number of the aforementioned formats, while yet additional content contains both audio and video in any number of the aforementioned formats.

As used herein, a "entity" may be any organization employing information technology resources and particularly technology infrastructure configured for processing large amounts of data related to the streaming of content. Typically, these data can be related to the entity's products or services, the customers, content owners, promotion owners, or any other aspect of the operations of the organization. As such, the entity may be any company, institution, group, association, establishment, union, authority or the like, employing information technology resources for processing large amounts of data.

As described herein, a "user" or a "consumer" may be an individual associated with an entity. As such, in some embodiments, the user may be an individual having past relationships, current relationships or potential future relationships with an entity. In some embodiments, the user may be an employee (e.g., a project manager, an IT specialist, a manager, an administrator, an internal operations analyst, or the like) of the entity or enterprises affiliated with the entity.

As used herein, a "control interface" may be a point of human-computer interaction and communication in a device that allows a user to input information, such as commands or data, into a device, or that allows the device to output information to the user. For example, the control interface includes a graphical user interface (GUI) or an interface to input computer-executable instructions that direct a processor to carry out specific functions. The control interface typically employs certain input and output devices such as a display, mouse, keyboard, button, touchpad, touch screen, microphone, speaker, LED, light, joystick, switch, buzzer, bell, and/or other user input/output device for communicating with one or more users.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to the actions of user relative the client device, a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, an "electronic resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, an electronic resource may be associated with one or more accounts or may be property that is not associated with a specific account. Examples of electronic resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this disclosure, an electronic resource is typically stored in an electronic resource repository—a storage location where one or more electronic resources are organized, stored and retrieved electronically using a computing device.

As used herein, a "electronic resource transfer" may refer to any transaction, activities or communication between a user, the entity, one or more financial institutions, and/or clearing houses. An electronic resource transfer may refer to any distribution of electronic resources such as, but not limited to, a payment, processing of funds, purchase of goods or services, a return of goods or services, a payment transaction, a credit transaction, or other interactions involving a user's electronic resource or account. Unless specifically limited by the context, a "electronic resource transfer" may refer to any activity between a user, a merchant, an entity, or any combination thereof. In some embodiments, an electronic resource transfer or transaction may refer to financial transactions involving direct or indirect movement of funds through traditional paper transaction processing systems (i.e., paper check processing) or through electronic transaction processing systems. When discussing that electronic resource transfers or transactions are evaluated, it could mean that the transaction has already occurred, is in the process of occurring or being processed, or that the transaction has yet to be processed/posted by one or more financial institutions.

Previously, artists, owners, and producers of the content, and the entities that may advertise within the content are unable to determine the attentiveness of consumers, the effectiveness of promotional content, the longevity of consumers while consuming the content, etc. Thus, entities and advertisers may distribute compensation through royalty payments that are not reflective of the quality of the interaction between a given content and a consumer. As a result, content that maintains high consumer engagement levels may receive a disproportionately low royalty payment, while content that ineffectively maintains consumer engagement levels may receive a disproportionately high royalty payment. Similarly, without such knowledge of engagement levels, promotional advertisers may pay a disproportionately high rate for advertising during content that does not effectively engaging the consumer, while other promotional advertisers may pay a disproportionately low rate for advertising during content that is very effective at engaging the consumer. Moreover, targeted promotional content was generally less effective than desired. Because such targeted promotional content stemmed from characters and words entered or searched by a consumer, websites travelled to by the consumer, or other monitoring of activity, the passive consumption of content (e.g., through visual or audio consumption) was often not considered as a factor for targeted advertising, even if such consumption comprised a majority of the usage of a client device by a consumer.

The technology described herein implements a novel approach to extracting text from multimedia, and using the extracted text as an input to a machine learning engine to (i) generate, from the text, targeted promotional content, and track the effectiveness thereof based on any subsequent purchases by the consumer, and (ii) generate, from the text, relevant questions and corresponding answers which are presented to the consumer during the consumption of the multimedia to calculate the consumer's engagement levels. Subsequently, a calculation of royalty payments may be made, which may depend on the engagement level of the consumer, the purchases as a result of the targeted promotional content, etc. Such royalty payments are transferred directly to producer(s), artist(s), and/or owner(s) and (iii) in predetermined portions.

Accordingly, the present disclosure embraces a system, computer program product, and method for distributing content and analyzing content engagement. Content is retrieved from a repository and audio data from the content is transformed into text. After a user selects the content on a client device, keywords are identified from text. During the streaming of the content at the client device, the status of the client device is queried at predetermined intervals to determine if the content is being streamed, or if streaming has ceased. Based on the overall length of the content being streamed, the percentage of the content streamed at the client device is used to determine a presence metric. Additionally, or alternatively, after the keywords are identified from the text, at least one question and corresponding answer are generated based on the keywords. During the streaming of the content, at least one of the generated questions is presented, and prompts the user for input. The input from the user is then compared to the generated answer, and an engagement score is determined based on the comparison. Subsequent royalty payments may be divided between parties and provided to the creator/owner of the content based on the engagement score. Additionally, or alternatively, portions of promotional content may be transformed into text data in a similar method as the content. Using this text data along with a semantic search, promotional content is identified that is most relevant to the text data from the content. Thereafter, the promotional content may be presented to the user on the client device. Purchases as a result of the promotional content may then be tracked, such that the effectiveness of the promotional content may be inferred, and a subsequent royalty payment is provided to the creator/owner of the content and/or entity based on the effectiveness of the promotional content.

The present disclosure provides a technical solution to a technical problem. As described herein, the technical problem includes the inability for entities, producers and/or owners of content, and advertisers to determine the effectiveness of their content and/or promotional content. The technical problem also includes the inability to distribute royalty payments in a manner which rewards effective promotional content and engagement levels of content. The technical solution presented herein utilizes a machine learning engine to extract text from content, the text being leveraged to provide relevant engagement questionnaires, promotional content, and subsequent royalty payments. In particular, the machine learning engine and subsequent utilization of keywords selected from the text of content is an improvement over existing solutions to the inability for entities, producers and/or owners of content, and advertisers to determine the effectiveness of their content and/or promotional content, (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for distribution of content and analysis of content engagement 100, in accordance with an embodiment of the disclosure. As shown in FIG. 1A, the distributed computing environment 100 contemplated herein may include a system 130, a client device(s) 140, and a network 110 over which the system 130 and client device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the client device(s) 140 may have a client-server relationship in which the client device(s) 140 are remote devices that request and receive service from a centralized server, i.e., the system 130. In some other embodiments, the system 130 and the client device(s) 140 may have a peer-to-peer relationship in which the system 130 and the client device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, entertainment consoles, mainframes, or the like, or any combination of the aforementioned.

The client device(s) 140 may represent various forms of electronic devices, including user input devices such as personal digital assistants, cellular telephones, smartphones, laptops, tablets, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the client device(s) 140, in accordance with an embodiment of the disclosure. As shown in FIG. 1C, the client device(s) 140 includes a processor 152, memory 154, an input/output device such as a display 156, a communication interface 158, and a transceiver 160, among other components. The client device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the client device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the client device(s) 140, such as control of user interfaces, applications run by client device(s) 140, and wireless communication by client device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of client device(s) 140 with other devices. External interface 168 may provide, for example, for wired communication in some implementations, or for wireless communication in other implementations, and multiple interfaces may also be used.

The memory 154 stores information within the client device(s) 140. The memory 154 can be implemented as one or more of a computer-readable medium or media, a volatile memory unit or units, or a non-volatile memory unit or units. Expansion memory may also be provided and connected to client device(s) 140 through an expansion interface (not shown), which may include, for example, a SIMM (Single In Line Memory Module) card interface. Such expansion memory may provide extra storage space for client device(s) 140 or may also store applications or other information therein. In some embodiments, expansion memory may include instructions to carry out or supplement the processes described above and may include secure information also. For example, expansion memory may be provided as a security module for client device(s) 140 and may be programmed with instructions that permit secure use of client device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the client device(s) 140 to transmit and/or receive information or commands to and from the system 130 via the network 110. Any communication between the system 130 and the client device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the client device(s) 140 may provide the system 130 (or other client devices) permissioned access to the protected resources of the client device(s) 140, which may include a GPS device, an image capturing component (e.g., camera), a microphone, a speaker and/or system device information stored in memory 154. The "system device information" may include information regarding when, where and how resources of the device are being utilized by the user, including, without limitation, sensor (e.g., data regarding use of the camera, touch screen, pushbutton controls, microphone, speakers, etc.) data, hardware and software details, screen/display usage, apps or software programs that are being used, usage of the user interface, and/or the status of the device (e.g., do not disturb, work, sleep, driving, personal).

The client device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to client device(s) 140, which may be used as appropriate by applications running thereon, and in some embodiments, one or more applications operating on the system 130.

The client device(s) 140 may also communicate audibly using audio codec 162, which may receive spoken information from a user and convert the spoken information to usable digital information. Audio codec 162 may likewise generate audible sound for a user, such as through a speaker, e.g., in a handset of client device(s) 140. Such sound may include sound from voice telephone calls, may include recorded sound (e.g., voice messages, music files, etc.) and may also include sound generated by one or more applications operating on the client device(s) 140, and in some embodiments, one or more applications operating on the system 130.

Various implementations of the distributed computing environment 100, including the system 130 and client device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary machine learning (ML) subsystem architecture 200, in accordance with an embodiment of the disclosure. The machine learning subsystem 200 may include a data acquisition engine 202, data ingestion engine 210, data pre-processing engine 216, ML model tuning engine 222, and inference engine 236.

The data acquisition engine 202 may identify various internal and/or external data sources to generate, test, and/or integrate new features for training the machine learning engine 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning engine 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning engine can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 222 may be used to train a machine learning engine 224 using the training data 218 to make predictions or decisions without explicitly being programmed to do so. The machine learning engine 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning engine type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning engine, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning engine 232 is one whose hyperparameters are tuned and model accuracy maximized.

The trained machine learning engine 232, similar to any other software application output, can be persisted to storage, file, memory, or application, or looped back into the processing component to be reprocessed. More often, the trained machine learning engine 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning engines trained using supervised learning algorithms may be used to structure computations in terms of categorized outputs (e.g., C_1, C_2 . . . C_n 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning engines trained using unsupervised learning algorithms may be used to group (e.g., C_1, C_2 . . . C_n 238) live data 234 based on how similar they are to one another to solve exploratory challenges where little is known about the data, provide a description or label (e.g., C_1, C_2 . . . C_n 238) to live data 234, such as in classification, and/or the like. These categorized outputs, groups (clusters), or labels are then presented to the user input system 130. In still other cases, machine learning engines that perform regression techniques may use live data 234 to predict or forecast continuous outcomes.

It will be understood that the embodiment of the machine learning subsystem 200 illustrated in FIG. 2 is exemplary and that other embodiments may vary. As another example, in some embodiments, the machine learning subsystem 200 may include more, fewer, or different components.

Some embodiments of the present invention are described herein with reference to flowchart illustrations or block diagrams of apparatus and/or methods such as those in FIGS. 3-5. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions are securely stored in a transitory and/or non-transitory computer-readable medium, such as a memory. This medium serves to effectively direct, instruct, and cause a computer and/or other programmable data processing apparatus to function in a precise manner. By storing the computer-executable program code portions in the computer-readable medium, an article of manufacture is produced. This article includes instruction mechanisms that actively implement the specified steps and/or functions outlined in the flowchart(s) and/or block diagram block(s).

Furthermore, the one or more computer-executable program code portions can be readily loaded onto a computer and/or other programmable data processing apparatus. This loading process triggers a series of operational steps to be executed on the computer and/or other programmable apparatus. In specific embodiments, this leads to the creation of a computer-implemented process. In this process, the computer-executable program code portions, which run on the computer and/or other programmable apparatus, deliver operational steps that effectively implement the steps specified in the flowchart(s) and/or the functions outlined in the block diagram block(s). Alternatively, computer-implemented steps can be combined with, or substituted by, operator- and/or human-implemented steps to successfully execute an embodiment of the present invention.

FIG. 3 illustrates a process flow 300 for distribution of content and analysis of content engagement, in accordance with an embodiment of the disclosure.

Prior to ever streaming a given content, as shown in block 302, the system 130 may retrieve content from a first storage device in preparation for the transformation steps that will be described henceforth. The content may comprise audio data. The audio data may be any sound that communicates in any spoken or written language, such as voice data, including but not limited to spoken word, song lyrics, speeches, and so forth. Audio data generally is transformed from an encoded format in the digital data into a mechanical sound via a processing device decoding the audio data and transmitting a signal to a speaker of a client device 140, headphones, headset, and various types of devices containing wireless or wired speakers.

However, and as shown in block 304, prior to ever communicating, transmitting, or otherwise presenting the content to a user for consumption, the system 130 may transform, using a speech recognition engine, the audio data from the content into text data. Given that the audio data contains voice data, the speech recognition engine may intercept the encoded or decoded audio data and process the audio data using algorithms. For example, the speech recognition engine may analyze the spectral patterns in the audio data, and employ various language models to match the spectral patterns with predetermined linguistic structures. The speech recognition engine may then compare the extracted features against a database of speech samples to determine the most probable words based on a predetermined probability threshold that correspond to the input audio data.

In some embodiments, the speech recognition engine may further implement a machine learning engine such as that which is described in FIG. 2 trained on speech samples for better refining of the machine learning engine abilities over time.

In some embodiments, the text data may be stored in a database within the first storage device where it is mapped to the corresponding content from which the text data was extracted. In other embodiments, the text data may be stored in a database within a distinct storage device where it is similarly mapped to the corresponding content in the first storage device from which the text data was extracted.

In some embodiments, storage device(s) storing text data or content described herein is within the local network 110 of the entity. Such a configuration presents several benefits compared to incumbent content streaming platforms, which typically do not provide storage within their own networks, and instead rely on storage devices external to the local network 110. By storing text data or content within the local network 110, data security and privacy are enhanced, faster and more efficient content streaming are available by reducing network congestion, and greater control over the content library is available without relying on external providers.

The process may continue at block 306, where the system 130 receives a first selection identifying the content. Typically, a user interacts with an entity application installed and executed on a client device 140. Such entity application generally provides users with various methods of interacting with content, including but not limited to browsing, searching, selecting, flagging, tagging, organizing, filtering, stopping, starting, fast forwarding, rewinding, and so forth. When a user arrives at a desired content through any one of the aforementioned methods, the user selects the content (the "first selection") for either (i) playing immediately, or (ii) queuing for later playing.

A selection of the content by the user via a control interface 164 of a client device 140 transmits a request to the system 130 to retrieve the content from the first storage device. A first storage device of the system 130 may be a storage device under control of the entity, a third-party, or a local storage device under the control of a user. To assist in the retrieval of the correct content from the first storage device, the content may be referenced by the entity application in any number of ways including but not limited to URLs, file paths, file identifiers or names referenced through an API endpoint, or database references in the entity application.

Prior to streaming the content, and as illustrated in block 308, the system 130 may retrieve the text data corresponding to the content from the first storage device. As previously described, a database is present in the first storage device that maps a given content to the text data generated in block 304. This database functions as a centralized repository where the text data is stored alongside metadata and other relevant information to indicate the corresponding content. After a request for streaming a particular content is received, the system 130 locates and retrieves the associated text data from this database where the text data is stored in a structured format and is temporarily held in a designated memory area within the system 130. This designated memory area serves as a temporary storage space for the analysis described with respect to block 310.

As shown in block 310, the system 130 may then identify keywords from the text data. Keywords are identified from the text data for numerous processes as will be described in further detail herein. In preparation for implementing these processes, the system 130 identifies the keywords and stores the keywords in a structured format in a database of a storage device. In some embodiments, this storage device is the first storage device, while in other embodiments the storage device is a second storage device or other remote storage device. In some embodiments, the identified keywords may be stored in a database alongside the corresponding text data, including any relevant metadata. In other embodiments, the identified keywords may be stored in a database alongside the corresponding content, including any relevant metadata.

In some embodiments, frequency based methods for keyword identification and extraction are implemented. Such frequency based methods may determine the frequency of occurrence of words in the text data to identify terms that appear most frequently. Words that occur more often are typically considered more important and are likely to be relevant keywords and thus identified. For example, if a word like "technology" appears multiple times in the text data, it may be identified as a keyword indicating the content's focus on technology.

Additionally, or alternatively, a machine learning engine may be applied to determine keywords from text data. Through training described in FIG. 2, the machine learning engine may recognize features and context cues that indicate the significance of a word in a given context. For example, the machine learning engine may be trained on a collection of political articles and thus can learn to identify political terminology as keywords and distinguishing them from others.

As shown in block 312, the system 130 may then stream the content. When a streaming request is made from the client device 140, a media server extracts and encodes the content, while a streaming protocol segments the content, allowing for efficient transmission over the network. The system 130 may then send each segment to the client device 140, which retrieves and plays the content by fetching subsequent segments.

During the streaming at the client device 140, in some embodiments, and as shown in block 314, the system 130 may determine a status of the streaming of the content at a predetermined interval subsequent an initiating of the stream of the content. At each of the predetermined intervals, the system 130 may determine if the streaming of the content is (i) still streaming, or (ii) no longer streaming. To do this, numerous methods may be employed, including, but not limited to, sending a signal from the client device 140 to the system 130 via the entity application at a regular predetermined interval to indicate to the system the status of the stream, analyzing network traffic, utilizing an API at the entity application to provide the system 130 with streaming data, and so forth.

The predetermined interval may be calculated as a percentage of the duration of the content. As one non-limiting example, the interval may be predetermined to be at twenty-five percent (25%) of the length of the content, fifty percent (50%), seventy-five percent (75%), and one-hundred percent (100%). Accordingly, a user may stream Podcast A at a client device 140 determined to have an overall length of thirty (30) minutes, as is documented in the metadata associated with Podcast A. Thus, the system 130 may determine the status of the streaming at seven and one-half minutes (7.5 minutes), fifteen minutes (15 minutes), twenty-two and one-half minutes (22.5 minutes), and thirty minutes (30 minutes).

It shall be appreciated that although the previous examples indicated predetermined intervals of equal duration, intervals may also be predetermined to be unequal duration.

As shown in block 316, the system 130 may then determine a presence metric of the stream of the content based on activity at each predetermined interval. A presence metric may indicate to the system 130 the proportion of the entirety of the content streamed at the client device 140, thus the presence metric increases for each subsequent interval for which the content is streamed. In some embodiments, the presence metric may be determined and stored as a simple percentage of the overall duration of the content. Continuing with the previous non-limiting example, if the system 130 at block 314 determined that a client device 140 streamed the content at the at seven and one-half minute (7.5 minute) interval, and the fifteen minute (15 minute) interval, but the content was not streamed at the twenty-two and one-half minute (22.5 minute) interval and thirty minute (30 minute) interval, the presence metric may be determined to be fifty percent (50%). As will be appreciated, in some embodiments the presence metric may "round up" to the next highest interval, such that the presence metric for the previous non-limiting example would be seventy-five percent (75%).

In other embodiments, categories may be predetermined such that a given percentage determined in the foregoing is reduced to a simple text tag or label based on predetermined thresholds. As one non-limiting example, predetermined thresholds may be set for indicating a "no stream" tag, such as between zero percent (0%) and fifteen percent (15%) of the overall duration. Similarly, predetermined thresholds may be set for indicating a "partial stream" tag, such as above fifteen percent (15%) and below seventy-five percent (75%) of the overall duration. Indeed, above seventy-five percent (75%) of the overall duration may be provided with a "full stream" tag. While the foregoing example indicates three categories and their corresponding thresholds, it shall be understood that any number of categories and any number of percentages may be predetermined, along with various tags or labels associated with each category.

Accordingly, the presence metric expressed as either a percentage, or tag/label as described above, may be associated with the user's profile in a database, stored as part of the content metadata, or temporarily stored in session data during the streaming session.

In some embodiments, a presence metric may be determined based on the time elapsed since a producer or owner of content has published or otherwise made the content available for streaming. By taking into consideration this elapsed time, the system 130 is able to determine how eager consumers of content are for the consumption thereof, thereby indicating how engaging the content is. First, the system may determine a publication timestamp of the content. For example, content may be made available to consumers at 3:00 P.M. on June 1, thus the timestamp may consist of at least one of: the time of 3:00 P.M., and the date of June 1. A predetermined threshold is provided to the system indicating a length of time, such as number of hours or number of days. For example, a predetermined threshold may be provided as two (2) hours. When the content is streamed at a client device 140, the system determines the timestamp of the streaming of the content (a "streaming timestamp"). Thereafter, the presence metric is determined based on the time difference between the publication timestamp and the streaming timestamp, which is determined in units of seconds, minutes, hours, or days. When the time difference is less than the predetermined threshold, the presence metric is given a high value, which may be a predetermined high value. When the time difference is greater than the predetermined threshold, the presence metric is given a low value, which may be a predetermined low value. Continuing with the previous example of a publication timestamp of 3:00 P.M. on June 1 and a predetermined threshold of two (2) hours, if the streaming timestamp is one (1) hour later at 4:00 P.M. on June 1, the presence metric may be determined to be the high value. However, if the streaming timestamp is three (3) hours later at 6:00 P.M. on June 1, the presence metric may be determined to be the low value.

In some embodiments, the process may continue as shown in FIG. 4, which illustrates a process flow 400 for distribution of content and analysis of content engagement, in accordance with an embodiment of the disclosure. As shown in block 402, the system 130 may generate a prompt and a corresponding expected response based on the text data of the content. It shall be appreciated that while the system 130 as described in blocks 314 and 316 may determine a presence metric corresponding to the amount of time that content is streamed, this presence metric does not provide any indication of the attentiveness of a user during the streaming of the content or how engaging or effective the content is. Accordingly, the system 130 may be configured to provide questions to the user through a control interface 164 of the client device 140 related to the portion of the content already streamed, where the questions are answered by the user. Questions that receive answers determined to be correct are an indication that the user is engaged with the content or the content is effective in providing engaging material to the user.

To generate a prompt(s) and corresponding expected response(s) based on text data, the system 130 may analyze the text data to identify relevant information using natural language processing to determine what portion would be suitable as a prompt. The natural language processing may identify key phrases or topics, and generate a question (i.e., a prompt) by utilizing semantic structures or predefined question templates. The expected answer (i.e., the expected response) is derived by considering the context and extracting relevant information from the text data. In some embodiments, the natural language processing may be integrated with a machine learning engine as illustrated in FIG. 2 to improve the ability of the system 130 to identify prompts and corresponding expected responses.

In some embodiments, the prompt is generated based only on the percentage of content that has currently been streamed. A predetermined interval may be defined, and a corresponding portion of the text data may be selected to be used as the input to determining the prompt. As one non-limiting example, it may be predetermined that a prompt will be provided after ten percent (10%) of the content has been streamed. Accordingly, the first ten percent (10%) of the text data may be isolated, and the prompt may be provided based on only that portion of the text data. For subsequent prompts, portions of the text data may be isolated that occur after a first predefined interval, but before a second predefined interval.

In some embodiments, prompts and corresponding expected responses may be predefined, such as by a user associated with the entity or a content owner, and the predefined prompt(s) and corresponding expected response(s) may be stored in a storage device of the system 130, along with metadata or database structure to associate the predefined prompt(s) and corresponding expected response(s) to the content, corresponding to intervals/timestamps of the content, and so forth.

The process may continue at block 404, where the system 130 presents on the control interface 164 the at least one prompt after streaming at least a portion of the content. It shall be understood that "presenting" may refer to showing a graphical embodiment of content over a graphical user interface or screen. However, in some embodiments, "presenting" may refer to playing an audio portion of content over a speaker of the client device 140, or any other method of delivering content via the client device 140. In some embodiments, the system 130 may present the prompt(s) as multiple-choice question(s), where the system 130 offers a set of predefined options related to the content. This allows a user to select a response without having to generate their own. Additionally, or alternatively, the system 130 may provide fill-in-the-blank style prompts, where certain words or phrases are omitted and a user is required to fill in the missing parts based on the streamed content. Additionally, or alternatively, the system 130 may present open-ended prompts.

In some embodiments, during the streaming of content, one prompt may be presented at a predetermined interval. However, in other embodiments, multiple prompts may be presented at predetermined intervals throughout the duration of the content, for example one prompt at half of the duration (the midpoint) and another prompt at the entirety of the duration (the ending).

As shown in block 406, the system 130 may then receive an input response to the prompt. As previously described, this may take the form of a selection of a multiple choice response, fill-in-the-blank response, or an open-ended response, or any combination thereof for embodiments where a series of prompts (i.e., multiple consecutive prompts) are presented. The input response is generally received through the client device 140 as input by a user, such as through a control interface 164, spoken into a microphone and transformed via speech to text, and so forth.

Next, and as shown in block 408, the system 130 may then determine a comparison result by comparing the input response to the corresponding expected response. As the expected response has been predetermined in block 402, in some embodiments the system 130 may pre-process and cleaning the input response to ensure consistency and remove unnecessary elements like punctuation or extra spaces. Next, the system 130 compares the processed input response to the predetermined expected response using similarity metrics or algorithms to assess the similarity between the two responses based on features like word overlap, sentence structure, or semantic meaning. The system 130 may then assign a similarity score or compute a distance metric to quantify the degree of matching between the processed input response and the corresponding expected response in a database of a storage device. By comparing these scores or metrics against a predefined threshold, the system 130 determines if the input response is a match, partial match, or mismatch with the expected response. In some embodiments, such as with multiple choice prompts, pre-processing and similarly score computation may not be necessary, and the system 130 may compare the selection made by the user to a corresponding expected response.

As shown in block 410, the system 130 may then store in a second storage device at least one selected from the group consisting of (i) the input response, (ii) the prompt corresponding to the input response, and (iii) the comparison result. It shall be understood that it may be beneficial for future usage by the system 130 to store results of the prompt, corresponding input response provided by the user, and whether the input response is correct (i.e., the result of the comparison in block 408). Accordingly, in some embodiments these may be stored in a second storage device, split between the second storage device and another storage device (such as the first storage device), or any combination thereof.

As shown in block 412, the system 130 may then determine an engagement score based on the comparison result. An engagement score can be determined by assessing the percentage of prompts (i.e., questions) that match their corresponding expected responses. An engagement score may also be determined solely using system device information or by using both system device information and by assessing the percentage of prompts (i.e., questions) that match their corresponding expected responses. Instead of the determination of a presence metric as illustrated in FIG. 3, here the engagement score provides an indication of user engagement/involvement based on the matching between user responses and expected answers. As one non-limiting example, if the system 130 determines that out of four (4) prompts, two (2) received responses match the expected answers, the engagement score would be fifty percent (50%). Additionally, or alternatively, in some embodiments predetermined thresholds may be established to categorize the engagement score into specific tags/labels. For example, a score between zero percent (0%) and fifteen percent (15%) may be labeled as "low engagement," while a score above seventy-five percent (75%) may be considered "high engagement." The system 130 may assign appropriate tags or labels based on these thresholds to describe the level of user engagement. Importantly, the number and description of categories, thresholds, and associated tags may vary depending on the specific implementation, allowing flexibility in classifying user engagement based on the engagement score. Such variations may be predetermined prior to determining the engagement score.

In some embodiments, the engagement score is weighted with an aggregate engagement score during the streaming. In embodiments where prompts are provided at a plurality of intervals of the content during streaming, it may be beneficial to determine the overall engagement of a user. Accordingly, engagement scores within the same stream of the content may be averaged with one another, given a predetermined weighting before averaging with other engagement scores of the content, and so forth.

As shown in block 414, the system 130 may then transfer electronic resources to at least one content owner of the content. As used herein, a "content owner" may refer to any entity maintaining a property interest in content, generally as it pertains to royalties. Examples of content owners include, but are not limited to, content creators, hosts, media companies, networks, news organizations, production companies, educational institutions, and so forth.

Unique to the present disclosure, the entity may incentivize content owners for providing content that engages users effectively, such as is determined based on the engagement score of the user during each stream. Accordingly, for each stream of content, electronic resources may be transferred from an account of the entity, or an account of a third-party or clearing house, to an account of one or more content owner(s) of the content based on the engagement score. A maximum amount of electronic resources to be provided to a content owner may be predetermined, such as may be negotiated or otherwise provided for by the entity. Based on the engagement score, a predetermined percentage of the maximum amount of electronic resources may be distributed to the account(s) of the content owner(s). For example, Customer A streamed Podcast B and achieved an engagement score of eighty-percent (80%) or "high engagement", the owner(s) of Podcast B may receive the maximum amount of electronic resources. Alternatively, if, Customer A streamed Podcast B and only achieved an engagement score of 10 (10%) or "low engagement", the owner(s) of Podcast B may only receive five percent (5%) of the maximum amount of electronic resources. Of course, the percentages of the maximum amount of electronic resources for various engagement scores may take numerous values, and will be predetermined prior to the execution of block 414.

Additionally, or alternatively, the entity may incentivize content owners based on the presence metric of user engagement during each stream. Consequently, for every content stream, electronic resources can be transferred from the entity's account, a third-party account, or a clearing house to the account(s) of the content owner(s) based on the presence metric. A predetermined maximum amount of electronic resources, which may be negotiated or provided by the entity, can be set for each content owner. Depending on the presence metric, a predetermined percentage of the maximum amount of electronic resources can be distributed to the content owner's account(s). As one non-limiting example, if Customer A streamed Podcast B and achieved a presence metric of eighty percent (80%) denoting "full stream," the owner(s) of Podcast B would receive the maximum amount of electronic resources. On the other hand, if Customer A streamed Podcast B with a presence metric of ten percent (10%) representing "no stream," the owner(s) of Podcast B would only receive five percent (5%) of the maximum amount of electronic resources.

In some embodiments, the process may continue at FIG. 5, which illustrates a process flow 500 for distribution of content and analysis of content engagement, in accordance with an embodiment of the disclosure.

It shall be appreciated that in some embodiments it may be beneficial to interject a streaming of content to provide additional content (i.e., "supplemental content") including, but not limited to, advertisements, livestreams, prompts, and various forms of other media. Supplemental content may be presented to a user at any predetermined interval of the content.

It may be beneficial to determine the effectiveness of supplemental content, such as how effective an advertisement was in influencing a subsequent purchase or browsing of the advertised product or service. Thus, tracking of actions by a user subsequent the streaming of supplemental content may provide valuable insights both to the entity and the content owner of the supplemental content. Such a method will be described fully hereinafter with respect to FIG. 5. However, it shall be appreciated that additionally, or alternatively, the effectiveness of supplemental content may be evaluated based on an engagement score, identical to the process described with respect to FIG. 4, but instead applied to the supplemental content within the content.

As shown in block 502, the system 130 may query a second storage device for a supplemental content. In order to provide supplemental content most related to the content during which the supplemental content is presented, and therefore potentially the most engaging supplemental content, the system 130 may first retrieve the keywords identified from the corresponding text data of the content as determined in block 310.

Next, as shown in block 504, the system 130 may then determine a relevant supplemental content. In some embodiments, the determination of a relevant supplemental content may be made by comparing text data generated for the supplemental content (in the same method as is described with respect to block 304) to the keywords identified for the content in block 502. Accordingly, a comparison of the quantity and frequency of terms shared between the text data of the supplemental content and the keywords of the content may be made, and supplemental content with a quantity or frequency of shared terms above a predetermined threshold may be determined to be relevant.

In other embodiments, the determination of a relevant supplemental content may be made by first identifying keywords of the supplemental content, by generating text data for the supplemental content and identifying keywords therein (in the same method as is described with respect to blocks 304-310). These keywords of the supplemental content may then be compared to the keywords identified for the content in block 502. A comparison of the quantity and frequency of terms shared between the keywords of the supplemental content and the keywords of the content may be made, and supplemental content with a quantity or frequency of shared terms above a predetermined threshold may be determined to be relevant.

It shall be appreciated that other factors may be considered in determining relevant supplemental content, including, but not limited to: a location of the client device 140 based on a geographic location module, system device information, interests or preferences selected by a user and stored in a profile of the user, overall trends of content streamed at a client device 140, and so forth. Importantly, such other factors can provide a profile or "persona" of a user that does not include or rely upon personally identifiable information about the user.

Next, and as shown in block 506, the system 130 may then retrieve the supplemental content from the storage device of the system 130. The supplemental content retrieved may have been determined to be relevant supplemental content in block 504. In embodiments where multiple supplemental content has been determined to be relevant supplemental content, various methods may be used to determine which supplemental content to retrieve, including but not limited to: sorting the relevant supplemental content based on relevance scores or timestamps, prioritizing the relevant supplemental content based on user preferences, or applying an algorithm that weighs factors such as popularity, user engagement, or relevance to the content. Once the appropriate supplemental content has been identified, the system 130 fetches it from the storage device for further processing or presentation.

As shown in block 508, the system 130 may then transmit the supplemental content over the network from the second storage device to a client device 140. Accordingly, in block 510, the system 130 then presents the supplemental content. In some embodiments, the supplemental content may be presented as soon as it is received by the client device 140. In other embodiments, the supplemental content may be temporarily stored in a storage device of the client device 140 to optimize the presenting process. This temporary storage allows for buffering and reduces interruptions or delays in presenting the supplemental content.

In some embodiments, the process may continue at block 512, where the system 130 receives interaction data with the supplemental content. Interaction data may take numerous forms, including, but not limited to, system device information, the user clicking on an interactive element, the user speaking words into a microphone of a client device, providing text to the supplemental content via the client device 140, and so forth. It shall be appreciated that some content and supplemental content may contain hyperlinks, buttons, or other interactive elements configured to receive interactions from users engaging with the content. For example, a hyperlink with text "Click here to learn more" may be embedded within content, allowing users to navigate to additional information related to the content. Similarly, a button labeled "Buy now" may be included in an advertisement that directs users to a commerce store. Other interactive elements like "Play/Pause" buttons may be presented in video or audio content, enabling users to control playback. These interactive elements can be designed to trigger specific actions, such as opening a new webpage, playing a video, initiating a download, or redirecting users to relevant sections within the content itself. Upon interaction with an interaction element by a user, interaction data is then transmitted to the entity to record/store on a storage device a record of the interaction. In this way, interaction data is collected to provide insights into the effectiveness of supplemental content during the presenting of the supplemental content, such as the number of interactions over a plurality of users who are presented the supplemental content.

During an interaction with the supplemental content, the system 130 may track whether a user makes a purchase based on receiving interaction data with the supplemental content. Such interactions, if lead to a purchase, produce an order identifier and an order timestamp. Furthermore, an association between a supplemental content identifier of the supplemental content and a content identifier of the content are maintained. For example, prior to presenting supplemental content, a unique identifier is retrieved from a database for both the supplemental content and the content from which the supplemental content is selected based on the text data. As a user proceeds with a purchase through interactions with the supplemental content generating interaction data, this supplemental content identifier and the content identifier are maintained in a database, and after a purchase has been made within the supplemental content, an order identifier is associated with the content identifier and the supplemental content identifier in the database. The order identifier, supplemental content identifier, and content identifier may be any alphanumeric string, randomly generated or generated according to any given algorithm. Moreover, in some embodiments, an order timestamp (i.e., a time and date code for when the purchase was made, or when the order identifier was generated) may be generated and associated with the order in the database.

Based on the presence of an order identifier indicating that a purchase was made, the association between an order identifier and the owner of the supplemental content and the order identifier and the owner of the content is present in the database. Thus, to reward to owner of the content for their effective engagement leading to the purchase of a product through the supplemental content, the system 130 may transfer electronic resources from an account of a content owner of the supplemental content associated with the supplemental content identifier to at least one content owner of the content associated with the content identifier. As previously described, each of the at least one content owner of the content may receive a predetermined percentage of the electronic resources.

In some embodiments, not only are the direct interactions tracked based on the interaction data in block 512, but additionally, or alternatively, the system 130 may apply cookie data as shown in block 514. Cookie data is applied to the client device 140 such as through a browser or entity application installed on the client device 140, and the cookie data allows the system 130 to track user interactions across multiple sessions, and provide insights into their engagement with the supplemental content. By utilizing the cookie data, the system 130 determines whether the user visited a website associated with the supplemental content at a later time or made a purchase (e.g., a transfer of electronic resources) on that particular website. Thus, a conversion rate and overall impact of the supplemental content is measured. For example, if a user is presented with supplemental content for a product and later visits the associated website to make a purchase, the system 130 attributes that conversion to the specific supplemental content. Thus, as shown in block 516, the system 130 may then determine, using the cookie data, if a transfer of electronic resources has occurred as a result of the supplemental content.

As illustrated in block 518, the system 130 may then transfer electronic resources from an account of a content owner of the supplemental content to at least one content owner of the content, wherein each of the at least one content owners of the content receives a predetermined percentage of the electronic resources. It shall be appreciated that supplemental content that yields a high conversion rate of users is much more valuable than supplemental content that yields a lower conversion rate. Thus, content owners of supplemental content may be willing to transfer a higher amount of electronic resources to content owners of content during which the supplemental content is presented, provided that the conversion rate is above a predetermined percentage. Accordingly, in some embodiments, electronic resources may be transferred according to a tiered system 130 based on the conversion rate of the supplemental content at predetermined tiers, each predetermined tier corresponding to one or more conversion rates. Higher conversion rates may result in a larger transfer of electronic resources, while lower conversion rates may correspond to a smaller transfer of electronic resource. In some embodiments, the predetermined percentage acts as a threshold, providing that only content owners of the supplemental content with a conversion rate above the specified threshold transfer electronic resources to content owners of the content.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, micro-code, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

It will be understood that any suitable computer-readable medium may be utilized. This includes, but is not limited to, a non-transitory computer-readable medium, which comprises tangible electronic, magnetic, optical, electromagnetic, infrared, semiconductor systems, devices, and other apparatuses. For instance, in certain embodiments, the non-transitory computer-readable medium encompasses tangible mediums like portable computer diskettes, hard disks, random access memory (RAM), read-only memory (ROM), erasable programmable read-only memory (EPROM or Flash memory), compact disc read-only memory (CD-ROM), and other tangible optical and/or magnetic storage devices. On the other hand, in different embodiments of the present invention, the computer-readable medium may assume a transitory nature, such as a propagation signal that incorporates computer-executable program code portions within it.

The one or more computer-executable program code portions responsible for executing operations of the present invention can be composed using object-oriented, scripted, and/or unscripted programming languages. Examples of such languages include Java, Perl, Smalltalk, C++, SAS, SQL, Python, Objective C, JavaScript, and similar ones. In some embodiments, the computer-executable program code portions used to carry out operations of the present invention are written in traditional procedural programming languages, such as the "C" programming languages and comparable languages. Additionally, or alternatively, the computer program code can be written in one or more multi-paradigm programming languages, such as F #.

It is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

What is claimed is:

1. A content management system, the system comprising:

a processing device;

a non-transitory storage device containing instructions when executed by the processing device, causes the processing device to perform the steps of:

retrieving content from a first storage device, wherein the content comprises audio data;

transforming, using a speech recognition engine, the audio data into text data;

receiving a first selection, wherein the first selection identifies the content;

retrieving the text data corresponding to the content from the first storage device;

identifying keywords from the text data;

streaming the content;

determining a publication timestamp of the content;

determining a streaming timestamp of the streaming of the content;

determining a presence metric of the streaming of the content, wherein the presence metric is determined by comparing, to a predetermined threshold, a time difference between the publication timestamp and the streaming timestamp, wherein the presence metric is assigned a high value if the time difference is below the predetermined threshold, and wherein the presence metric is assigned a low value if the time difference is above the predetermined threshold; and transferring electronic resources to at least one content owner of the content, wherein each of the at least one content owner of the content receives a predetermined percentage of the electronic resources based on the presence metric.

2. The system of claim 1, wherein executing the instructions further causes the processing device to perform the steps of:

determining a status of the streaming of the content, wherein determining occurs at a predetermined interval subsequent an initiating of the stream of the content; and determining a presence metric of the stream of the content based on activity at each predetermined interval, wherein the presence metric increases for each subsequent interval for which the content is streamed.

3. The system of claim 1, wherein executing the instructions further causes the processing device to perform the steps of:

generating a prompt and a corresponding expected response based on the text data of the content;

presenting the at least one prompt after streaming at least a portion of the content;

receiving an input response to the prompt;

determining a comparison result by comparing the input response to the corresponding expected response;

storing in a second storage device at least one selected from the group consisting of (i) the input response, (ii) the prompt corresponding to the input response, and (iii) the comparison result; and determining an engagement score based on the comparison result.

4. The system of claim 1, wherein executing the instructions further causes the processing device to perform the steps of:

querying a second storage device for a supplemental content using the keywords identified from the text data;

determining a relevant supplemental content;

retrieving the supplemental content from the storage device of the system;

transmitting the supplemental content; and presenting the supplemental content.

5. The system of claim 3, wherein the engagement score is weighted with an aggregate engagement score during the streaming.

6. The system of claim 4, wherein executing the instructions further causes the processing device to perform the steps of:

receiving interaction data with the supplemental content;

applying cookie data; and determining, using the cookie data, if a transfer of electronic resources has occurred as a result of the supplemental content.

7. The system of claim 4, wherein executing the instructions further causes the processing device to perform the steps of:

receiving interaction data with the supplemental content, wherein the interaction data comprises an order identifier and an order timestamp, and a content identifier; and determining a content identifier and a supplemental content identifier, wherein the content identifier and the supplemental content identifier are associated with the order identifier.

8. The system of claim 3, wherein executing the instructions further causes the processing device to perform the steps of:

transferring electronic resources to the at least one content owner of the content, wherein each of the at least one content owner of the content receives a predetermined percentage of the electronic resources based on the engagement score.

9. The system of claim 4, wherein executing the instructions further causes the processing device to perform the steps of:

transferring electronic resources from an account of a content owner of the supplemental content to the at least one content owner of the content, wherein each of the at least one content owner of the content receives a predetermined percentage of the electronic resources.

10. The system of claim 7, wherein executing the instructions further causes the processing device to perform the steps of:

transferring electronic resources from an account of a content owner of the supplemental content associated with the supplemental content identifier to the at least one content owner of the content associated with the content identifier, wherein each of the at least one content owner of the content receives a predetermined percentage of the electronic resources.

11. The system of claim 3, further comprising:

receiving system device information; and determining an engagement score based on the comparison result and system device information.

12. A computer program product for content management, the computer program product comprising a non-transitory computer-readable medium comprising code causing an apparatus to:

retrieve content from a first storage device, wherein the content comprises audio data;

transform, using a speech recognition engine, the audio data into text data;

receive a first selection, wherein the first selection identifies the content;

retrieve the text data corresponding to the content from the first storage device;

identify keywords from the text data;

stream the content;

determine a publication timestamp of the content;

determine a streaming timestamp of the streaming of the content;

determine a presence metric of the streaming of the content, wherein the presence metric is determined by comparing, to a predetermined threshold, a time difference between the publication timestamp and the streaming timestamp, wherein the presence metric is assigned a high value if the time difference is below the predetermined threshold, and wherein the presence metric is assigned a low value if the time difference is above the predetermined threshold;

transferring electronic resources to at least one content owner of the content, wherein each of the at least one content owner of the content receives a predetermined percentage of the electronic resources based on the presence metric.

13. The computer program product of claim 12, comprising code causing an apparatus to:

determine a status of the streaming of the content, wherein determining occurs at a predetermined interval subsequent an initiating of the stream of the content; and determine a presence metric of the stream of the content based on activity at each predetermined interval, wherein the presence metric increases for each subsequent interval for which the content is streamed.

14. The computer program product of claim 12, comprising code causing an apparatus to:

query a second storage device for a supplemental content using the keywords identified from the text data;

determine a relevant supplemental content;

retrieve the supplemental content from the storage device of the system;

transmit the supplemental content; and present the supplemental content.

15. The computer program product of claim 14, comprising code causing an apparatus to:

receive interaction data with the supplemental content;

apply cookie data; and determine, using the cookie data, if a transfer of electronic resources has occurred as a result of the supplemental content.

16. The computer program product of claim 14, comprising code causing an apparatus to:

receive interaction data with the supplemental content, wherein the interaction data comprises an order identifier and an order timestamp, and a content identifier; and determine a content identifier and a supplemental content identifier, wherein the content identifier and the supplemental content identifier are associated with the order identifier.

17. The computer program product of claim 14, comprising code causing an apparatus to:

transfer electronic resources from an account of a content owner of the supplemental content to the at least one content owner of the content, wherein each of the at least one content owner of the content receives a predetermined percentage of the electronic resources.

18. The computer program product of claim 16, comprising code causing an apparatus to:

transfer electronic resources from an account of a content owner of the supplemental content associated with the supplemental content identifier to the at least one content owner of the content associated with the content identifier, wherein each of the at least one content owner of the content receives a predetermined percentage of the electronic resources.

19. The computer program product of claim 12, comprising code causing an apparatus to:

generate a prompt and a corresponding expected response based on the text data of the content;

present the at least one prompt after streaming at least a portion of the content;

receive an input response to the prompt;

determine a comparison result by comparing the input response to the corresponding expected response;

store in a second storage device at least one selected from the group consisting of (i) the input response, (ii) the prompt corresponding to the input response, and (iii) the comparison result; and determine an engagement score based on the comparison result.

20. The computer program product of claim 19, wherein the engagement score is weighted with an aggregate engagement score during the streaming.

21. The computer program product of claim 19, comprising code causing an apparatus to:

transfer electronic resources to the at least one content owner of the content, wherein each of the at least one content owner of the content receives a predetermined percentage of the electronic resources based on the engagement score.

22. The computer program product of claim 19, comprising code causing an apparatus to:

receive system device information; and determine an engagement score based on the comparison result and system device information.

23. A method for content management, the method comprising:

retrieving content from a first storage device, wherein content comprises audio data;

transforming, using a speech recognition engine, the audio data into text data;

receiving a first selection, wherein the first selection identifies the content;

retrieving the text data corresponding to the content from the first storage device;

identifying keywords from the text data;

streaming the content;

determining a publication timestamp of the content;

determining a streaming timestamp of the streaming of the content;

determining a presence metric of the streaming of the content, wherein the presence metric is determined by comparing, to a predetermined threshold, a time difference between the publication timestamp and the streaming timestamp, wherein the presence metric is assigned a high value if the time difference is below the predetermined threshold, and wherein the presence metric is assigned a low value if the time difference is above the predetermined threshold;

transferring electronic resources to at least one content owner of the content, wherein each of the at least one content owner of the content receives a predetermined percentage of the electronic resources based on the presence metric.

24. The method of claim 23, the method further comprising:

determining a status of the streaming of the content, wherein determining occurs at a predetermined interval subsequent an initiating of the stream of the content; and determining a presence metric of the stream of the content based on activity at each predetermined interval, wherein the presence metric increases for each subsequent interval for which the content is streamed.

25. The method of claim 23, the method further comprising:

generating a prompt and a corresponding expected response based on the text data of the content;

presenting the at least one prompt after streaming at least a portion of the content;

receiving an input response to the prompt;

determining a comparison result by comparing the input response to the corresponding expected response;

storing in a second storage device at least one selected from the group consisting of (i) the input response, (ii) the prompt corresponding to the input response, and (iii) the comparison result; and determining an engagement score based on the comparison result.

* * * * *